(12) United States Patent
Chen

(10) Patent No.: US 6,317,483 B1
(45) Date of Patent: Nov. 13, 2001

(54) DOUBLY CURVED OPTICAL DEVICE WITH GRADED ATOMIC PLANES

(75) Inventor: Zewu Chen, Ballston Lake, NY (US)

(73) Assignee: X-Ray Optical Systems, Inc., Albany, NY (US)

( * ) Notice: Subject to any disclaimer, the term of this patent is extended or adjusted under 35 U.S.C. 154(b) by 0 days.

(21) Appl. No.: 09/450,323

(22) Filed: Nov. 29, 1999

(51) Int. Cl.[7] .................................................... G21K 1/06

(52) U.S. Cl. ............................................. 378/84; 378/145

(58) Field of Search ................................ 378/84, 85, 145

(56) References Cited

U.S. PATENT DOCUMENTS

| | | | |
|---|---|---|---|
| 4,599,741 | 7/1986 | Wittry | 378/85 |
| 4,780,899 | 10/1988 | Adema et al. | 378/84 |
| 4,949,367 | 8/1990 | Huizing et al. | 378/84 |
| 5,027,377 | * 6/1991 | Thoe | 378/145 |
| 5,646,976 | 7/1997 | Gutman | 378/84 |
| 5,737,137 | 4/1998 | Cohen et al. | 359/859 |
| 5,799,056 | 8/1998 | Gutman | 378/84 |
| 5,843,235 | 12/1998 | Bergman et al. | 118/720 |
| 6,226,349 | * 5/2001 | Schuster et al. | 378/84 |

FOREIGN PATENT DOCUMENTS

| | | | |
|---|---|---|---|
| 0200261 | 4/1989 | (EP) | G21K/1/06 |
| 0339713 | 11/1989 | (EP) | G21K/1/06 |
| 02160517 | 6/1990 | (JP) | B29C/43/18 |

OTHER PUBLICATIONS

Sasanuma Y et al., "A point–focusing small–angle x–ray scattering camera using a doubly curved monochromator of W/Si multilayer", Review of Scientific Instruments, vol. 67, No. 3, Mar. 1, 1996, 1996 American Institute of Physics, pp. 688–692.

Nakajima K et al., "Growth of Ge–rich $Si_xGe_{1-x}$ single crystal with uniform composition (x=0.02) on a compositionally graded crystal for use as GaAs solar cells", Journal of Crystal Growth, vol. 205, No. 3, Sep. 1999, 1999 North–Holland Publishing Co., pp. 270–276.

Z.W. Chen and D.B. Wittry, "Microanalysis by Monochromatic Microprobe X–ray Fluorescence—Physical Basis, Properties and Future Prospects", J. Appl. Phys., 84(2), p.1064 (1998).

J.E. Bijorkholm, J. Bokor, L. Eichner, R.R. Freeman, J. Gregus, T.E. Jewell, W.M. Mansfield, A.A. Mas Dowell, E.L. Raab, W.T. Silfvast, L.H. Szeto, D.M. Tennant, W.K. Waskiewicz, D.L. Windt, and O.R. Wood, and J.H. Bruning, "Reduction imaging at 14 nm using mutlilayer coated optics: Printing of features smaller than 0.1 nm", p. 1509, (Nov./Dec. 1990).

Robert K. Smither and Patricia B. Fernandes, "Variable–metric diffraction crystals for x–ray optics", Rev. Sci. instrum. 68(2), pp. 1755–1762, (1991).

Z.W. Chen and D.B. Wittry, "Microprobe x–ray fluorescence with the use of point–focusing difffractors", Appl. Phys. Lett. 71 (13), Sep. 29, 1997, 1997 American Institute of Physics, pp. 1884–1886.

(List continued on next page.)

Primary Examiner—David P. Porta

(57) ABSTRACT

An optically curved device is presented for use in focusing or imaging x-rays from a divergent source. The device includes a plurality of curved atomic reflection planes, at least some of which are separated by a spacing d which varies in at least one direction across the optically curved device. A doubly curved optical surface is disposed over the plurality of curved reflection planes. The spacing d varies continuously in the at least one direction for enhanced matching of incident angles of x-rays from a divergent source impinging on the optical surface with the Bragg angles on at least some points of the optical surface. The doubly curved optical surface can have an elliptic, parabolic, spheric or aspheric profile.

13 Claims, 8 Drawing Sheets

OTHER PUBLICATIONS

Z.W. Chen and D.B. Wittry, "Microanalysis by monochromatic microprobe x–ray fluorescence–physical basis, properties, and future prospects", Journal of Applied Physics, vol. 84, No. 2, Jul. 15, 1998, 1998 American Institute of Physics, pp. 1064–1073.

* cited by examiner

DOUBLY CURVED OPTICAL DEVICE WITH GRADED ATOMIC PLANES

TECHNICAL FIELD

The present invention relates to doubly curved optical elements, and in particular, to a doubly curved optical device having multiple reflection planes separated by a spacing d which varies in at least one direction.

BACKGROUND OF THE INVENTION

Crystalline materials, which have periodic structure, can be used to reflect x-rays based on diffraction. The reflection of x-rays from crystal planes can only occur when the Bragg condition is met:

$$2d \sin \theta = n\lambda$$

Where $\lambda$ is the x-ray wavelength, d is the spacing of reflection planes, $\theta$ is the incident angle with respect to the reflection planes, and n is the reflection order. The d spacings for natural crystals and most synthetic crystals are constant. In order to reflect x-rays of the same wavelength efficiently, a crystal optical element must have a near constant incident angle with respect to the reflection planes of the crystal on every point of the surface. Crystal optics based on Bragg reflection have been widely used for x-ray monochromators and high-resolution spectroscopy. However, the applications of crystal optics for focusing and collimating x-rays from a laboratory source have been limited because of the strict requirement of the Bragg condition and the narrow rocking curve widths for most useful crystalline materials.

For many applications of microanalysis, an intense monochromatic x-ray beam based on a laboratory type source is needed. Three-dimensional focusing of x-rays from a laboratory source involves doubly bent crystal optics. The practical use of a toroidal crystal to focus 8 ke V x-rays has been demonstrated recently with the use of a mica crystal based on the Johann type point to point focusing geometry. For example, reference an article by Z. W. Chen and D. B. Wittry entitled "Microanalysis by Monochromatic Microprobe X-ray Fluorescence-Physical Basis, Properties and Future Prospects", J. Appl. Phys., 84(2), page 1064 (1998). However, the Bragg condition cannot be satisfied on every point of the crystal using this approach due to the geometrical aberration of the Johann geometry in the Roland circle plane, which will limit the collection solid angle of the optic. The spot size of the focused beam is also limited by the geometrical aberration of the toroidal surface.

On the other hand, a parallel monochromatic x-ray beam is useful for many x-ray diffraction applications. Conventional crystal optics with constant d spacing cannot provide efficient collimation of hard x-rays from a divergent source since the incident angle must vary from point to point for any type of collimating mirror. For high-resolution x-ray diffraction applications, the monochromaticity provided by conventional multilayer optics is relatively poor and the divergence is not small enough.

SUMMARY OF THE INVENTION

Briefly summarized, the present invention comprises in one aspect an optically curved device which includes a plurality of curved atomic planes, at least some of which are separated by a spacing d which varies in at least one direction. The device further includes an optical surface which is doubly curved and disposed over the plurality of curved atomic planes. The spacing d varies in the at least one direction and is determined from a Bragg equation, where a Bragg angle is an incident angle of an x-ray from a source impinging on the optical surface on at least some points of the optical surface.

To restate, it is an object of this invention to provide significantly improved curved crystal optical elements for focusing, collimating and imaging of x-rays. These curved crystal optics are characterized in that the lattice parameters change laterally in at least one direction. The variation of the crystal lattice parameter can be produced by growing a crystal made of two or more elements and changing the relative percentage of the two elements as the crystal is grown. By varying the d spacing laterally across the surface of a crystal optic, the Bragg angle $\theta$ on every point of the crystal can be matched to the incident angle exactly, which improves significantly the efficiency of curved crystal elements and eliminates any geometric aberration.

The optical shapes of two-dimensionally curved graded crystal elements can be circular, ellipsoidal, parabolic, spherical, and other aspherical shapes. An example of a doubly curved element is given in FIGS. 3A & 3B. FIG. 3A shows that the element can be elliptically curved in one-dimension, while FIG. 3B shows that the element can be circularly curved in the other dimension. This provides point-to-point focusing. The ellipsoidal geometry provides point to point focusing of monochromatic x-rays. Graded crystal elements with an ellipsoidal shape can capture a large solid angle from a small x-ray source and form a micro monochromatic x-ray beam, useful for micro beam analysis, e.g., monochromatic micro XRF (X-ray Fluorescence), small spot XPS (X-ray Photoelectron Spectroscopy). The paraboloid geometry provides a collimating x-ray beam from a point source. Crystal elements with graded d spacing planes curved to a paraboloid shape can capture significant solid angle and produce a collimating beam from a pont-type laboratory source. Due to the narrow energy bandwidth of the crystal optic, the collimating beam can be highly monochromatic with small divergence, which is required for high-resolution x-ray diffraction. Finally, graded crystal optics with a spherical geometry can be applied to image hard x-rays. The combination of spherical optics, such as Schwarzschild optics, can provide strong demagnification and form a sub-micron x-ray beam based on a laboratory source.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
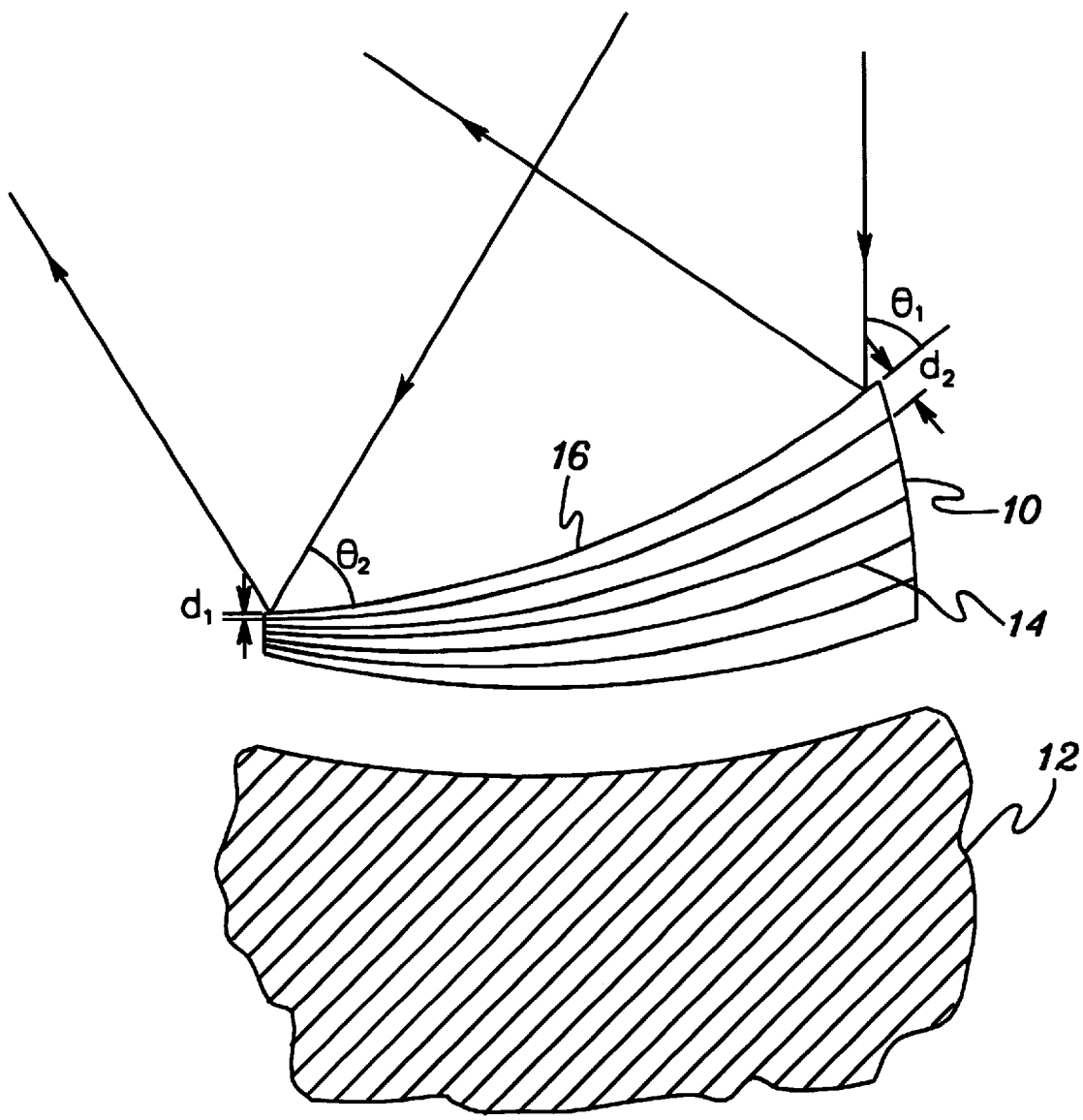
FIG. 1 is an exploded cross-sectional view of an x-ray optical element in accordance with the principles of the present invention.

In accordance with this invention, an x-ray reflective device shown in FIG. 1 comprises a curved crystal 10 and support base 12. Crystal 10 has a set of curved atomic reflection planes 14. On every point of the crystal surface, atomic plane set 14 is near parallel to the crystal surface 16 in the embodiment shown. The spacing between the atomic planes, d, varies continuously from $d_1$ at one end of the crystal to $d_2$ at the other end of the crystal. Values of $d_1$ and $d_2$ are determined from the Bragg equation where the Bragg angles are the incident angles $\theta_1$ and $\theta_2$, respectively. According to the Bragg equation, the Bragg angles of reflective planes 14 for x-ray photons of wavelength $\lambda$ vary with the d spacing profiles. The configuration of the crystal surface 16 can be spherical, ellipsoidal, paraboloidal, toroidal, or other type of doubly curved surface. The profile of the d spacing for the crystal planes is designed to allow the incident angles of monochromatic x-rays from a divergent laboratory source to match the Bragg angle on each point of the crystal surface.

Figure 2:
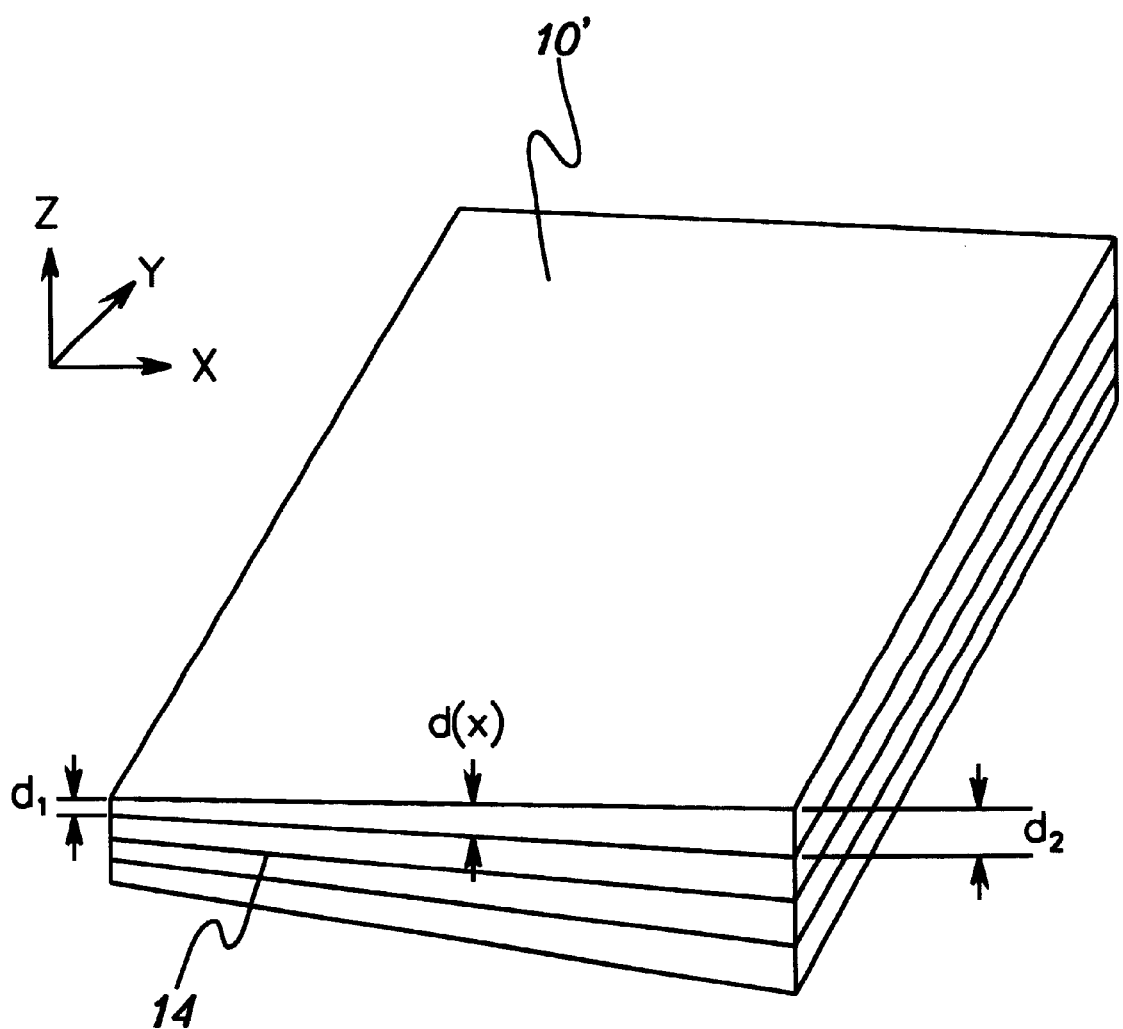
FIG. 2 is a flat crystal plate that has a set of atomic planes with graded d spacing.

The optical device according to the present invention can be fabricated by bending a flat thin crystal slab 10 as shown in FIG. 2 with a desired d spacing profile to a preselected geometry. One bending method is the fabrication process described in co-pending, commonly assigned U.S. patent application Ser. No. 09/342,606, entitled "Curved Optical Device and Method of Fabrication," the entirety of which is hereby incorporated herein by reference. The variation of the d spacing of the crystal planes can be produced by growing a crystal made of two or more elements and changing the relative percentages of the two elements as the crystal is grown. For instance, the lattice parameter of a Si—Ge crystal varies with a change in concentration of Ge. Therefore, a crystal material with a graded lattice parameter can be obtained by growing a Si—Ge crystal and controlling the concentration of Ge during growth. Such crystal planes are commercial available and can be purchased, for example, from Virginia Semiconductor, Inc. of Fredericksburg, Va.

Figure 3A:
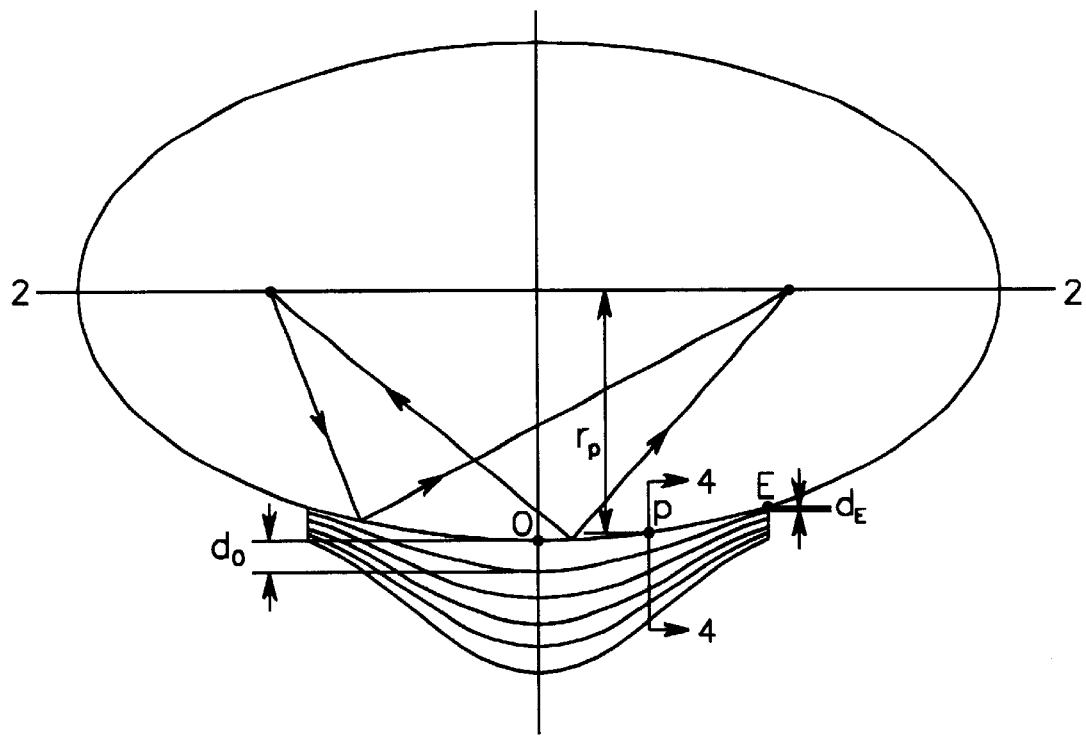
FIG. 3A is a cross-sectional view of one embodiment of the present invention in which the graded crystal planes are curved to an ellipsoidal shape in one dimension, providing symmetrical point to point focusing of monochromatic x-rays.
Figure 3B:
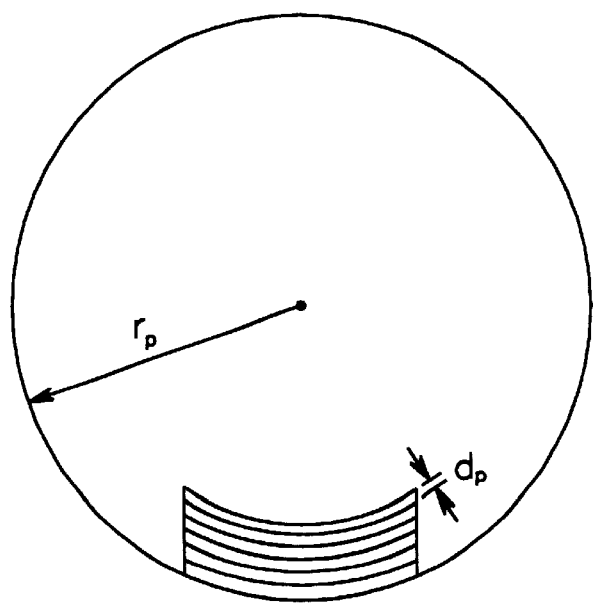
FIG. 3B is a cross-sectional view of the crystal of FIG. 3A taken along line 4—4.
Figure 3C:
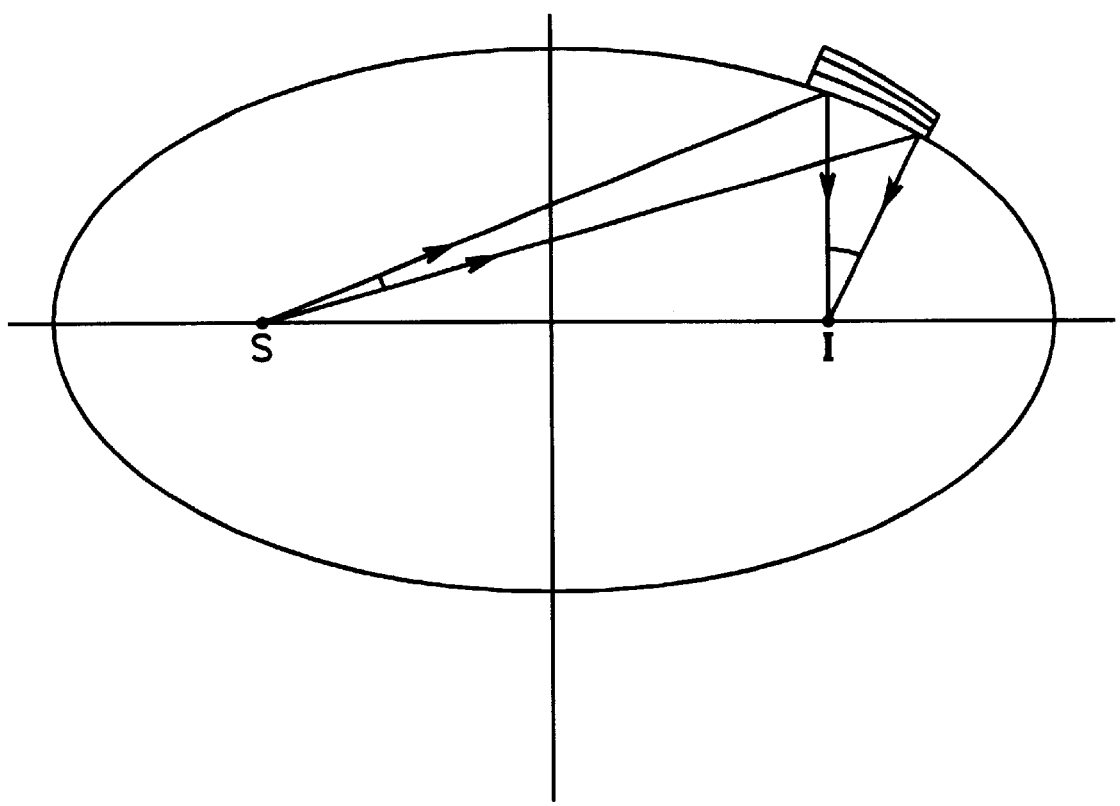
FIG. 3C is an optical element similar to that in FIG. 3A, but with an asymmetrical configuration and providing demagnification of source S in accordance with an alternate embodiment of the present invention.
Figure 4:
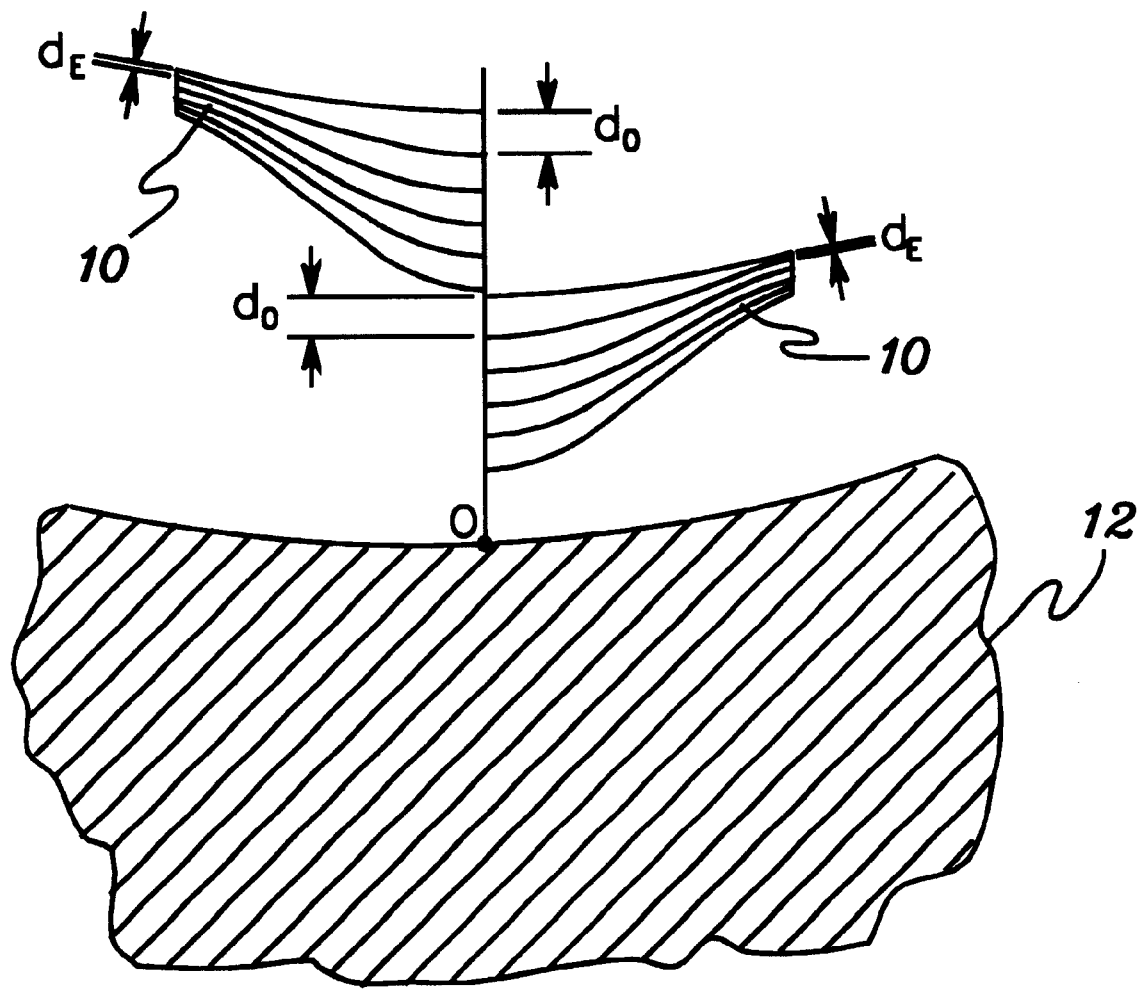
FIG. 4 is an exploded view of an ellipsoidal crystal device that comprises two identical crystals with graded d spacings in accordance with the present invention.

One embodiment of the present invention providing point to point x-ray imaging is illustrated in FIG. 3A. Crystal planes 14 are curved to an ellipsoidal shape and the d spacing of the planes varies along the direction parallel to the optical axis 2—2. For the symmetrical configuration shown in FIG. 3A, the d spacing of reflection planes has a maximum value $d_0$ at the center point O and decreases as edge E is approached. With the decrease of the d value from the center O of the crystal to the edge E, the Bragg angle for x-rays of wavelength $\lambda$ increases, which matches the increase of the incident angles from O to E for x-rays diverging from the left focus of the ellipse. A cross-section of the crystal taken along line 4—4 is shown in FIG. 3B. In this plane, the crystal planes are circular and the d spacing does not vary. FIG. 3C shows an asymmetrical arrangement of a point to point focusing geometry, which provides demagnification of source S. The ellipsoidal crystal element in FIG. 3A can be made by bending a flat crystal 10 (see FIG. 2) to an ellipsoid, where the d spacing of the flat crystal 10 varies along the X direction but is constant along the Y direction (see FIG. 2). The optical element shown in FIG. 3A may be fabricated in two pieces such that two identical flat crystal slabs with graded d spacing from $d_0$ to $d_E$ can be used as shown in the exploded view of FIG. 4. In this embodiment, the two crystals are joined at O and the surface is ellipsoidal. This approach allows the grading to increase in one dimension. Conversely, the element in FIG. 3A requires a grading profile that increases and then decreases.

Figure 5A:
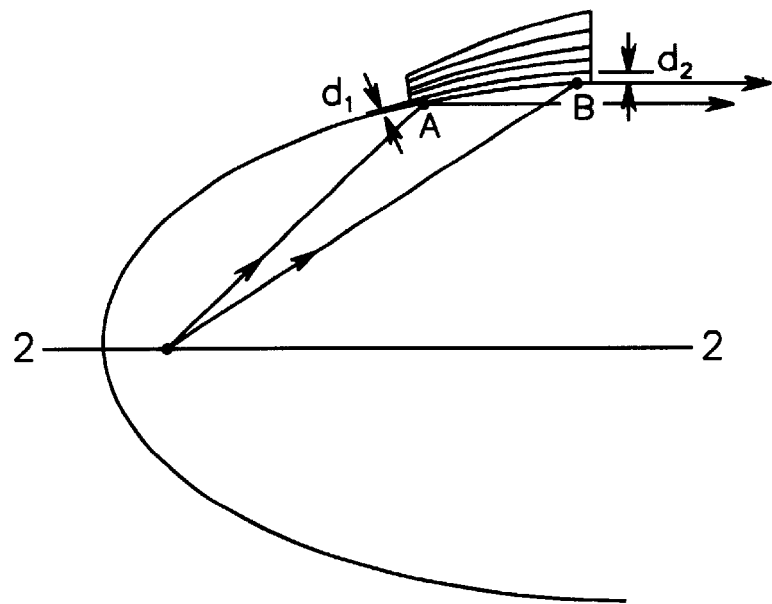
FIG. 5A is a cross-sectional view of another embodiment of an optical element in accordance with the present invention showing graded crystal planes curved to paraboloid shape and providing a collimating beam from a point x-ray source.
Figure 5B:
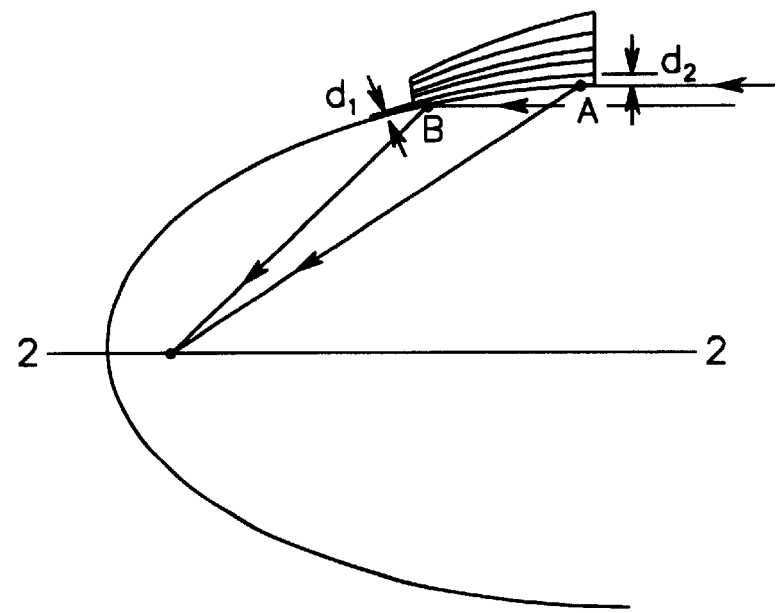
FIG. 5B is a cross-sectional view of another embodiment of an optical element in accordance with the present invention showing graded crystal planes curved to paraboloid shape, and accepting a collimating beam and directing it to a focal spot.

A curved crystal device with paraboloid geometry is shown in FIG. 5A. This device produces a monochromatic collimating x-ray beam from a point source S. The d spacing of the reflection plane of the crystal 10 is graded from a value of $d_1$ to $d_2$. To satisfy the Bragg condition, the d spacing profile is linear for the first order approximation and increases from point A to B. Alternatively, a collimated beam can be directed to a focal spot as shown in FIG. 5B.

The focusing and collimating of x-rays can also be obtained with a spherical geometry at near normal incidence using crystalline planes with graded d spacing. Spherical mirrors are well known as imaging devices for normal incident visible light optics. A conventional spherically bent crystal can demagnify (or magnify) and collimate x-rays from a divergent x-ray source for some particular wavelength at near normal incidence. However, the numerical aperture of this type device is too small to be useful. The numerical aperture can be improved substantially with the use of graded d spacing, doubly curved crystals in accordance with the present invention.

Figure 6A:
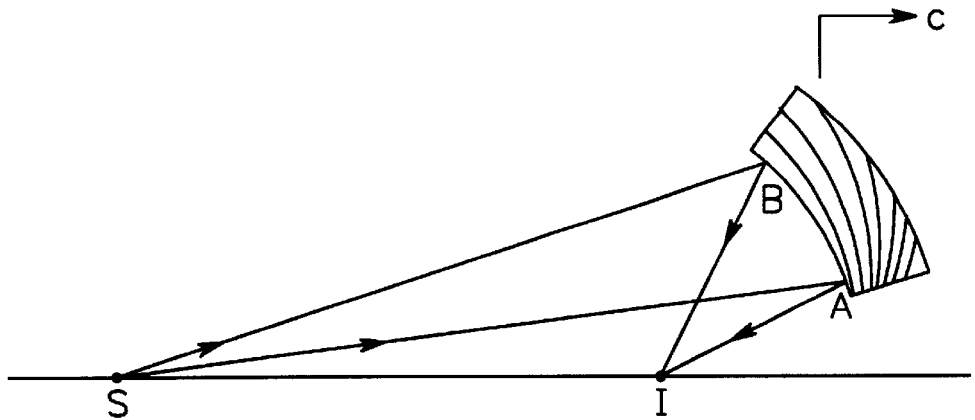
FIG. 6A depicts a spherical optical element in accordance with the present invention for imaging a source with close to normal angle incident.
Figure 6A:
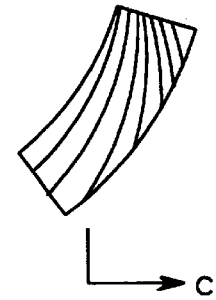
Figure 6B:
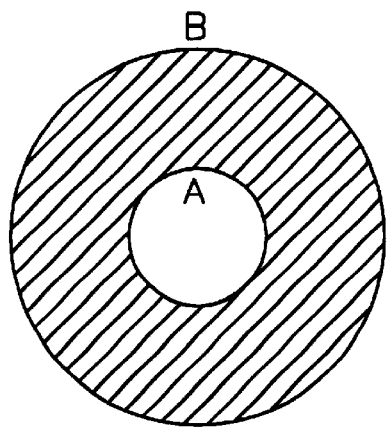
FIG. 6B is a cross-sectional view of the spherical device of FIG. 6A taken line c—c.
Figure 6C:
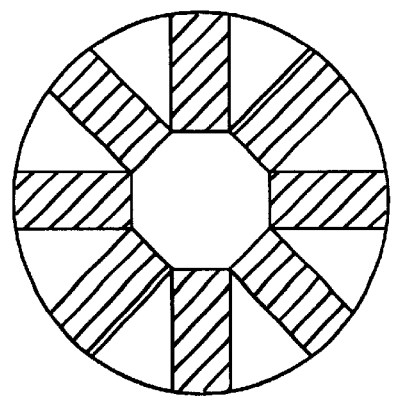
FIG. 6C is a cross-sectional view of a spherical device comprising multiple pieces of crystal slabs with simple graded d profile in accordance with another embodiment of the present invention.

FIG. 6A shows a set of spherical curved crystal planes according to another embodiment of the present invention, which provides a demagnified image of the x-ray source. The d spacing of the crystal planes has a symmetrical profile about the optical axis and varies along the transverse direction. It increases across the surface from points A to B. The normal projecting view along the optical axis is illustrated in FIG. 6B. The d spacing profile of this device may be difficult to obtain. In practice, it can be approximated by using multiple pieces of crystal slabs with a simple graded d profile as shown in FIG. 6C. Each piece of crystal is curved to a spherical shape with the reflection planes parallel to the surface. The d spacing profile of the reflection planes is one-dimensionally graded along the radial direction passing the center of each crystal. If an x-ray source is placed at the focus of the concave spherical device similar to the orientation shown in FIG. 6A, a collimating x-ray beam is obtained.

Figure 7:
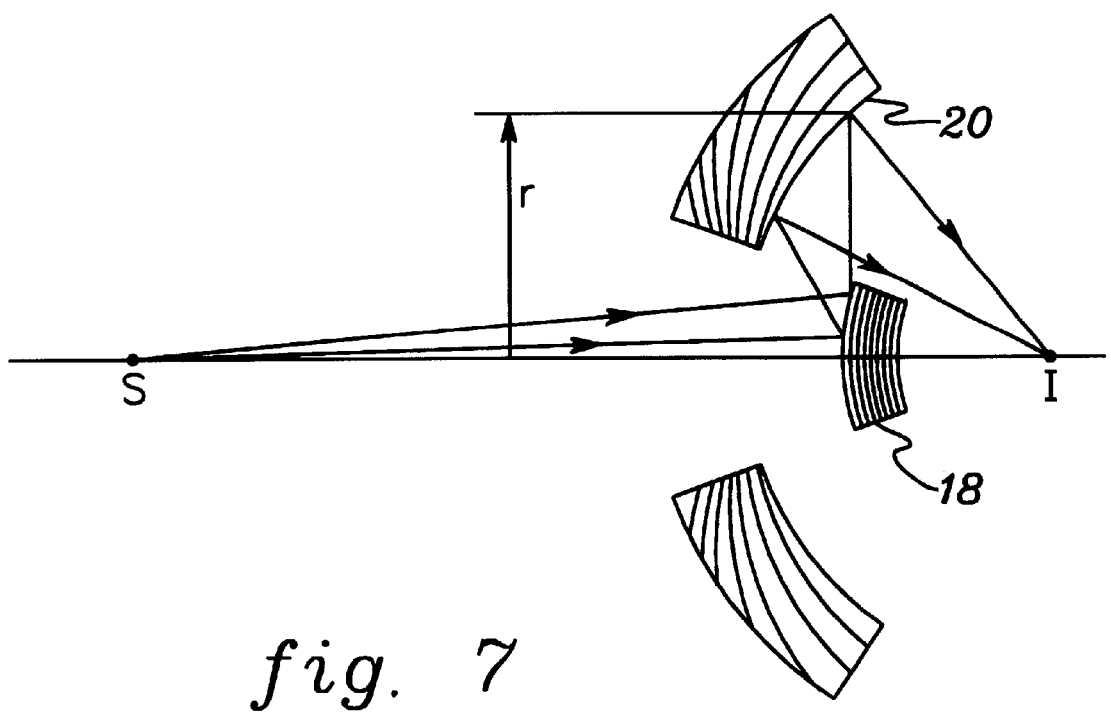
FIG. 7 shows a configuration of two graded concave crystals in accordance with the present invention for strong demagnification imaging.

Strong demagnification can be obtained if two spherical crystal devices are combined. One preferred geometry is the Schwarzschild configuration which is used to image soft x-rays in conjunction with a multilayer coating. Graded crystals with the Schwarzschild geometry provide imaging for hard x-rays as shown in FIG. 7. The reflection planes of primary crystal 18 has a d spacing profile of $d_1(r)$ to reflect x-rays from a source emitting x-rays at a near normal incident angle. The reflection planes of the secondary crystal 20 have the desired profile $d_2(r)$ to match the incident angles of the x-rays reflected off the primary crystal 18. This system produces a final image of the source at I.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An optically curved device comprising:
   a plurality of curved atomic planes, at least some curved atomic planes being separated by a spacing d which varies in at least one direction;
   an optical surface disposed over said plurality of curved atomic planes, said optical surface being doubly curved; and
   wherein said spacing d varies in at least one direction and is determined from a Bragg equation, where a Bragg angle is an incident angle of an x-ray from a source impinging on said optical surface on each of at least some points of said optical surface.

2. The optically curved device of claim 1, wherein said spacing d varies in said at least one direction to achieve maximum reflectivity of x-rays from said divergent source.

3. The optically curved device of claim 1, wherein said doubly curved optical surface comprises one of an elliptic, parabolic, spheric or aspheric profile.

4. The optically curved device of claim 3, wherein said doubly curved optical surface comprises an elliptical profile and said optically curved device provides point to point focusing of x-rays.

5. The optically curved device of claim 3, wherein said doubly curved optical surface comprises a parabolic profile and said optically curved device provides collimation of x-rays from a point source.

6. The optically curved device of claim 3, wherein said doubly curved optical surface comprises a spherical profile and said optically curved device provides imaging of x-rays.

7. The optically curved device of claim 3, wherein said doubly curved optical surface has a profile adapted for at least one of point to point focusing, directing a divergent x-ray beam from a point source to a collimated beam, directing an x-ray beam from a point source to an x-ray beam with a different divergence angle, or imaging of x-rays.

8. The optically curved device of claim 1, wherein said optically curved device comprises an SiGe crystal, and wherein a ratio of silicon to germanium in said at least some curved atomic planes separated by said varying spacing d varies across said optically curved device.

9. The optically curved device of claim 1, wherein said optically curved device comprises at least a first crystal piece and a second crystal piece, wherein each crystal piece includes said plurality of curved atomic planes and said optical surface disposed thereover.

10. The optically curved device of claim 9, wherein said first crystal piece and said second crystal piece are disposed symmetrical about a center axis of said optically curved device.

11. The optically curved device of claim 9, wherein said first crystal piece comprises a first spherical optic and second crystal piece comprises a second spherical optic, wherein said first spherical optic and said second spherical optic are configured as Schwarzschild optics, and wherein said optically curved device provides demagnification of x-rays from said divergent source.

12. The optically curved device of claim 1, wherein said spacing d varies in two dimensions for matching of incident angles of x-rays from said divergent source impinging on said optical surface with a Bragg angle on each of a plurality of points disposed across said optical surface.

13. The optically curved device of claim 12, wherein said plurality of points are disposed in a radial distribution across said optical surface.

* * * * *